Patented Nov. 22, 1949

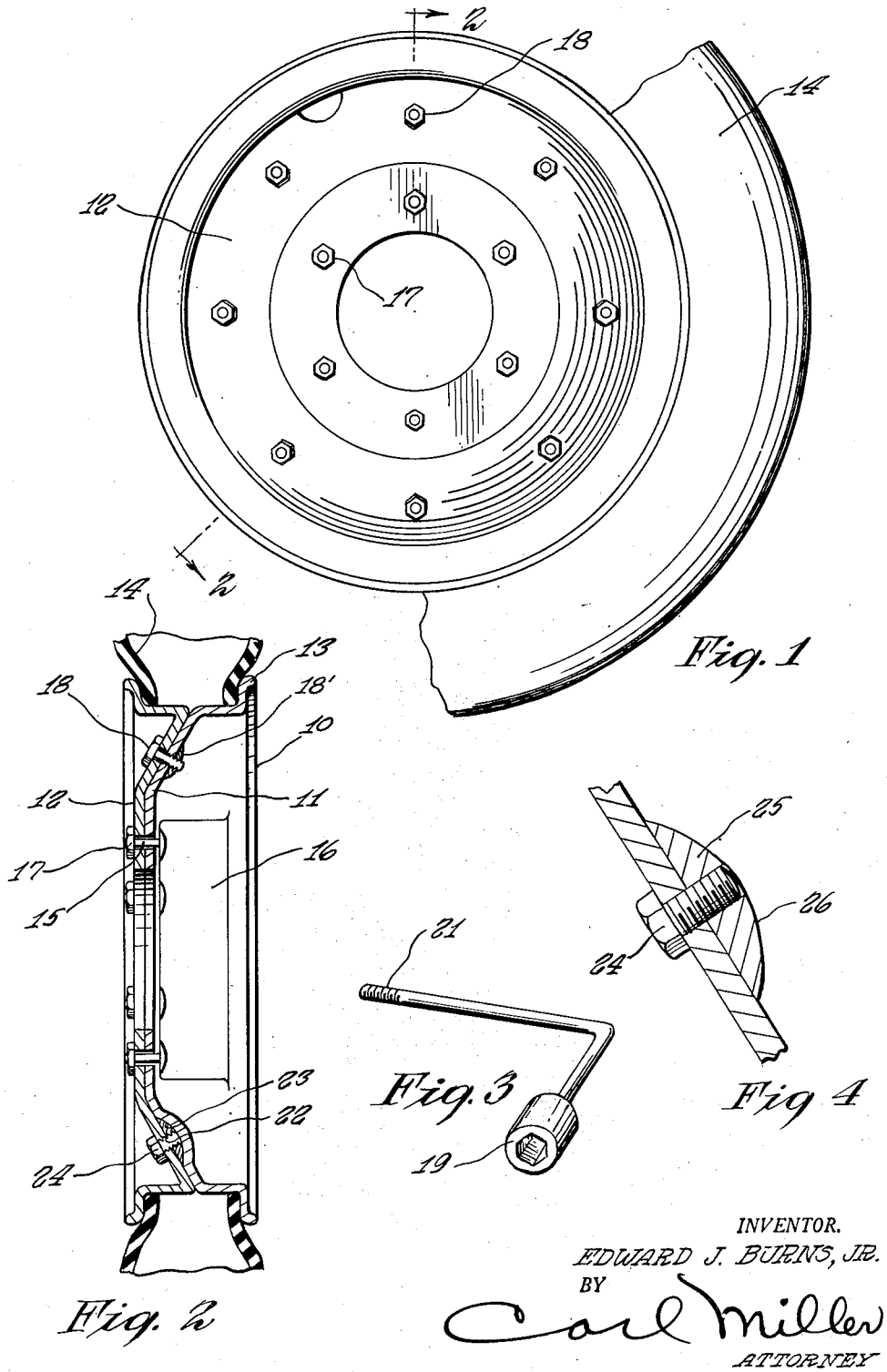

2,488,762

UNITED STATES PATENT OFFICE 2,488,762

SPLIT DEMOUNTABLE RIM

Edward J. Burns, Jr., Staten Island, N. Y.

Application April 15, 1947, Serial No. 741,478

2 Claims. (Cl. 301—63)

This invention relates to a split demountable tire rim for use on rubber tired vehicles.

It is an object of the present invention to provide a tire rim which can be separated in two parts to permit the easy removal of the tire from the rim.

Other objects of the present invention are to provide a split demountable rim which is of simple construction, easy to separate, inexpensive to manufacture and efficient in operation.

Still another object of the present invention is to provide a demountable rim which may be formed of pressed metal and wherein there is provided a depression or recess to which is welded a solid piece with which engagement is made by the attaching screws to connect the split demountable parts together and wherein the demountable parts when connected together both receive the attaching bolts which connect the rim with the wheel drum.

For other objects and for a better understanding of the invention, reference may be had to the following detailed description taken in connection with the accompanying drawing, in which Fig. 1 is a front elevational view of the rim with a fragment of a tire connected thereto.

Fig. 2 is a cross-sectional view taken on line 2—2 of Fig. 1.

Fig. 3 is a perspective view of a tool used for separating the rim parts and for connecting them together.

Fig. 4 is an enlarged cross-sectional view showing the centering plug with a filler screw therein.

Referring now to the figures, 10 represents a split demountable rim formed a part 11 and a part 12. These parts are pressed from metal and have the usual rim flanges 13 adapted to receive the inner periphery of a tire 14. These parts have radially inwardly extending portions adapted to be united with one another and attached by means of bolts 15 with wheel drum 16. The bolts 15 are made integral with the wheel drum and the parts are secured thereon by attaching nuts 17.

The parts are connected together by attaching bolts 18 into threaded portion of part 11, including disk 18' welded to same. When it is desired to remove the tire 14 from the parts 11 and 12, the bolts 18 are removed and the parts may be separated whereby to easily permit the removal of the tire 14.

A tire tool as shown in Fig. 3 has a nut recess 19 which is adapted to receive the attaching nuts 17 and 18. The opposite end of the tool has a threaded portion 21. This threaded portion may be extended through a threaded opening 22 in the part 12 and is adapted to engage with the bottom of a depression 23 in the part 11. A filler screw 24 is first removed and then the threaded portion 21 of the tool is inserted. By turning the threaded portion engagement is made with the part 11 and the parts will be readily and easily separated should they for any reason be stuck together due to rust. In order to provide adequate thread length, there is welded to the inner face of the part 12 a disc 25 rounded as indicated at 26 and adapted to nicely fit within the recess 23. This disc 25 also serves to properly locate the part 12 upon the part 11 when these parts are being assembled together upon the tire 14.

While various changes may be made in the detailed construction, it shall be understood that such changes shall be within the spirit and scope of the present invention as defined by the appended claims.

Having thus set forth and disclosed the nature of this invention, what is claimed is:

1. A split demountable rim comprising two parts each of which having radially inwardly extending portions and flange portions for receiving a tire, said radially inwardly extending portions having openings adapted to receive the bolts of a wheel drum which serves to attach the rim to the wheel drum, fastening bolts for securing the rim parts together, one of said parts having a depression therein, the other rim part having a disc portion secured to the same and adapted to be centered in the depression whereby to properly locate the other of said parts upon the one part, said other rim part and the disc being threaded and adapted to receive a tool which when extended into the same will engage the bottom of the depression whereby to effect a separating force upon the parts and to split them from one another upon disassembling the parts and the tire.

2. A split demountable rim comprising two parts each of which having radially inwardly extending portions and flange portions for receiving a tire, said radially inwardly extending portions having openings adapted to receive the bolts of a wheel drum which serves to attach the rim to the wheel drum, fastening bolts for securing the rim parts together, one of said parts having a depression therein, the other rim part having a disc portion secured to the same and adapted to be centered in the depression whereby to properly locate the other of said parts upon the one part, said rim other part and the disc being threaded and adapted to receive a tool which when extended into the same will engage the bottom of the depression whereby to effect a separating force upon the parts and to split them from one another upon disassembling the parts and the tire, and a filler plug adapted to be fitted within the threaded opening in the other part and in the disc.

EDWARD J. BURNS, JR.

REFERENCES CITED

The following references are of record in the file of this patent:

UNITED STATES PATENTS

| Number | Name | Date |
| --- | --- | --- |
| 1,501,743 | Bowen | July 15, 1924 |
| 1,654,035 | Campos et al. | Dec. 27, 1927 |
| 2,095,342 | Nelson | Oct. 12, 1937 |
| 2,249,889 | Dotson | July 22, 1941 |